US012758466B2

(12) United States Patent
Holmes

(10) Patent No.: US 12,758,466 B2
(45) Date of Patent: Oct. 13, 2026

(54) BLISTER CARD

(71) Applicant: RXSAFE LLC, Vista, CA (US)

(72) Inventor: William K. Holmes, San Diego, CA (US)

(73) Assignee: RXSAFE LLC, Vista, CA (US)

( * ) Notice: Subject to any disclaimer, the term of this patent is extended or adjusted under 35 U.S.C. 154(b) by 76 days.

(21) Appl. No.: 18/720,390

(22) PCT Filed: Dec. 19, 2022

(86) PCT No.: PCT/US2022/053317
§ 371 (c)(1),
(2) Date: Jun. 14, 2024

(87) PCT Pub. No.: WO2023/114532
PCT Pub. Date: Jun. 22, 2023

(65) Prior Publication Data

US 2025/0049634 A1 Feb. 13, 2025

Related U.S. Application Data

(60) Provisional application No. 63/290,839, filed on Dec. 17, 2021.

(51) Int. Cl.
*A61J 1/03* (2023.01)
*B65B 9/04* (2006.01)

(52) U.S. Cl.
CPC ............... *A61J 1/035* (2013.01); *B65B 9/045* (2013.01)

(58) Field of Classification Search
CPC ..... A61J 1/035; B65D 75/327; B65D 75/367; B65B 9/045

(Continued)

(56) References Cited

U.S. PATENT DOCUMENTS 4,125,190 A 11/1978 Davie, Jr. et al.
5,379,572 A * 1/1995 Giovannone ..... B29C 66/91411 53/329.3

(Continued)

FOREIGN PATENT DOCUMENTS

EP 1633650 B1 1/2008
EP 1622817 B1 10/2011

(Continued)

OTHER PUBLICATIONS

Medication Packaging Solutions. How to Assemble a 31 Day Single Dose Blister Card. Youtube Video. Available on Apr. 29, 2018. Available online at https://www.youtube.com/watch?v=Gay1pAvCVGM (9 pages).

(Continued)

*Primary Examiner* — Steven A. Reynolds
(74) *Attorney, Agent, or Firm* — Michael Best & Friedrich LLP

(57) ABSTRACT

One aspect provides a blister card for packaging pharmaceuticals including a blister sheet having a plurality of blister compartments defining a recess to receive medications. The blister card also includes a label sheet configured to be placed over the blister sheet to cover the plurality of blister compartments. The label sheet includes a plurality of seal portions that align with and correspond to each of the plurality of blister compartments. The blister card further includes a plurality of seals having a first type of seal and a second type of seal configured to adhere the label sheet to the blister sheet.

26 Claims, 5 Drawing Sheets

(58) Field of Classification Search
USPC .......................................... 206/538, 528, 531
See application file for complete search history.

(56) References Cited

U.S. PATENT DOCUMENTS

| | | | |
|---|---|---|---|
| 5,522,505 A | 6/1996 | Giovannone | |
| 5,613,349 A | 3/1997 | Brown | |
| 7,063,211 B2 | 6/2006 | Williams-Hartman | |
| 7,144,635 B2 | 12/2006 | Hawes et al. | |
| 7,188,728 B2 | 3/2007 | Williams-Hartman | |
| 7,448,496 B2 | 11/2008 | Williams-Hartman | |
| 7,607,539 B2 | 10/2009 | Freeze | |
| 7,665,610 B2 | 2/2010 | Williams-Hartman | |
| 7,891,492 B2 | 2/2011 | Wenninger et al. | |
| 7,896,161 B2 | 3/2011 | Reilley et al. | |
| 7,905,355 B2 | 3/2011 | Williams-Hartman | |
| 7,997,411 B2 | 8/2011 | Williams-Hartman | |
| 8,225,933 B2 | 7/2012 | Wade | |
| 8,328,018 B2 | 12/2012 | Sack et al. | |
| 8,544,650 B2 | 10/2013 | Williams-Hartman | |
| 8,740,003 B2 * | 6/2014 | Elliott | B65D 75/327 220/359.3 |
| 8,752,704 B2 | 6/2014 | Leon Alonso et al. | |
| 8,905,237 B2 | 12/2014 | Leon Alonso et al. | |
| 9,242,777 B2 | 1/2016 | Williams-Hartman | |
| 9,314,402 B2 | 4/2016 | Alonso et al. | |
| 9,445,970 B2 | 9/2016 | Alonso et al. | |
| 9,526,673 B2 | 12/2016 | Alonso et al. | |
| 9,988,195 B2 | 6/2018 | Williams-Hartman | |
| 10,611,928 B2 | 4/2020 | Lin et al. | |
| 2004/0140242 A1 * | 7/2004 | Davies | B65D 75/5833 206/538 |
| 2007/0224379 A1 | 9/2007 | Stevenson | |
| 2008/0093372 A1 | 4/2008 | Milton | |
| 2009/0014350 A1 | 1/2009 | Gaumont | |
| 2010/0193392 A1 | 8/2010 | Karow | |
| 2012/0305584 A1 * | 12/2012 | Carson | B65D 77/204 206/534 |
| 2014/0150376 A1 | 6/2014 | Milton | |
| 2015/0101283 A1 | 4/2015 | Fuhrmann et al. | |
| 2016/0083127 A1 | 3/2016 | Tillstrom | |
| 2016/0132658 A1 * | 5/2016 | Patel | G16H 70/40 705/2 |
| 2016/0143809 A1 * | 5/2016 | Webster | B65D 83/0463 206/531 |
| 2016/0175195 A1 | 6/2016 | Carson et al. | |
| 2018/0134475 A1 | 5/2018 | Newman | |
| 2019/0185244 A1 | 6/2019 | Hermann et al. | |
| 2020/0258611 A1 | 8/2020 | Patel | |

FOREIGN PATENT DOCUMENTS

| | | | |
|---|---|---|---|
| EP | 2125560 | B1 | 11/2011 |
| EP | 2651365 | B1 | 12/2011 |
| EP | 2455300 | A1 | 5/2012 |
| EP | 2080716 | B1 | 12/2012 |
| EP | 2532342 | A1 | 12/2012 |
| EP | 3025698 | A1 | 6/2016 |
| WO | 1990006309 | A1 | 6/1990 |
| WO | 2009006309 | A1 | 1/2009 |
| WO | 2021084373 | A1 | 5/2021 |

OTHER PUBLICATIONS

Hannan Packaging USA. Pro Pack® New B9X12 Blister Packaging Sealing Machine and Printed Blister Packaging Cards. Youtube Video. Publicly available on May 19, 2015. Available online at https://www.youtube.com/watch?v=gR0mBJ9SZys (10 pages).

Forgetting the Pill. Monthly Cold Seal Medicaton Blister Cards—Book Fold 6 Pack. Webpage. Accessed on Sep. 18, 2021. Available online at https://web.archive.org/web/20210918235009/https://forgettingthepill.com/products/monthly-cold-seal-medication-blister-cards-book-fold-6-pack-item-dp851-6-reg (2 pages).

International Search Report and Written Opinion for Application No. PCT/US2022/053317, dated Mar. 20, 2023 (17 pages).

European Patent Office. Extended European Search Report for Application No. 22908526.1, dated Nov. 11, 2025 (9 pages).

* cited by examiner

BLISTER CARD

CROSS-REFERENCE TO RELATED APPLICATIONS

This application claims priority to U.S. Provisional Patent Application No. 63/290,839, filed Dec. 17, 2021, the entire contents of which are incorporated by reference herein.

FIELD

The present disclosure relates to a blister card for medications.

SUMMARY

One example provides a blister card for packaging pharmaceuticals including a blister sheet having a plurality of blister compartments defining a recess to receive medications. The blister card also includes a label sheet configured to be placed over the blister sheet to cover the plurality of blister compartments. The label sheet includes a plurality of seal portions that align with and correspond to each of the plurality of blister compartments. The blister card further includes a plurality of seals having a first type of seal and a second type of seal configured to adhere the label sheet to the blister sheet.

Another example provides a blister card for packaging pharmaceuticals including a blister sheet having a plurality of blister compartments defining a recess to receive medications. The blister card also includes a label sheet configured to be placed over the blister sheet. The blister card further includes a plurality of cold seals and a plurality of hot seals provided between the blister sheet and the label sheet and configured to adhere the label sheet to the blister sheet.

Another example provides a method of filling a blister card. The method includes providing a blister sheet including a plurality of blister compartments. Each blister compartment defining a recess configured to receive medications. The method also includes filling at least one of the plurality of blister compartments with one or more medications and placing a label sheet over the blister sheet to cover the plurality of blister compartments. The label sheet includes a plurality of seal portions that align with and correspond to each of the plurality of blister compartments. The method further includes activating a first type of seal between the blister sheet and the label sheet to temporarily connect the label sheet to blister sheet and activating a second type of seal between the blister sheet and the label sheet to permanently secure the label sheet to the blister sheet.

Other examples, aspects, embodiments, and features will become apparent by consideration of the detailed description and accompanying drawings.

DETAILED DESCRIPTION

Before any examples, features, aspects, or embodiments are explained in detail, it is to be understood that the examples, features, aspects, or embodiments are not limited in their application to the details of construction and the arrangement of components set forth in the following description or illustrated in the following drawings. The examples, features, aspects, or embodiments are capable of being practiced or of being carried out in various ways.

Pharmacies use several types of packaging to provide pharmaceutical products or medications to consumers. The types of packaging may include strip packages, blister cards, pill vials, and the like. Pill vials and strip packages are most appropriate for individual customers of retail pharmacies. However, institutional customers, for example, nursing homes, palliative or hospice facilities, hospitals, and the like use blister cards extensively.

Figure 1:
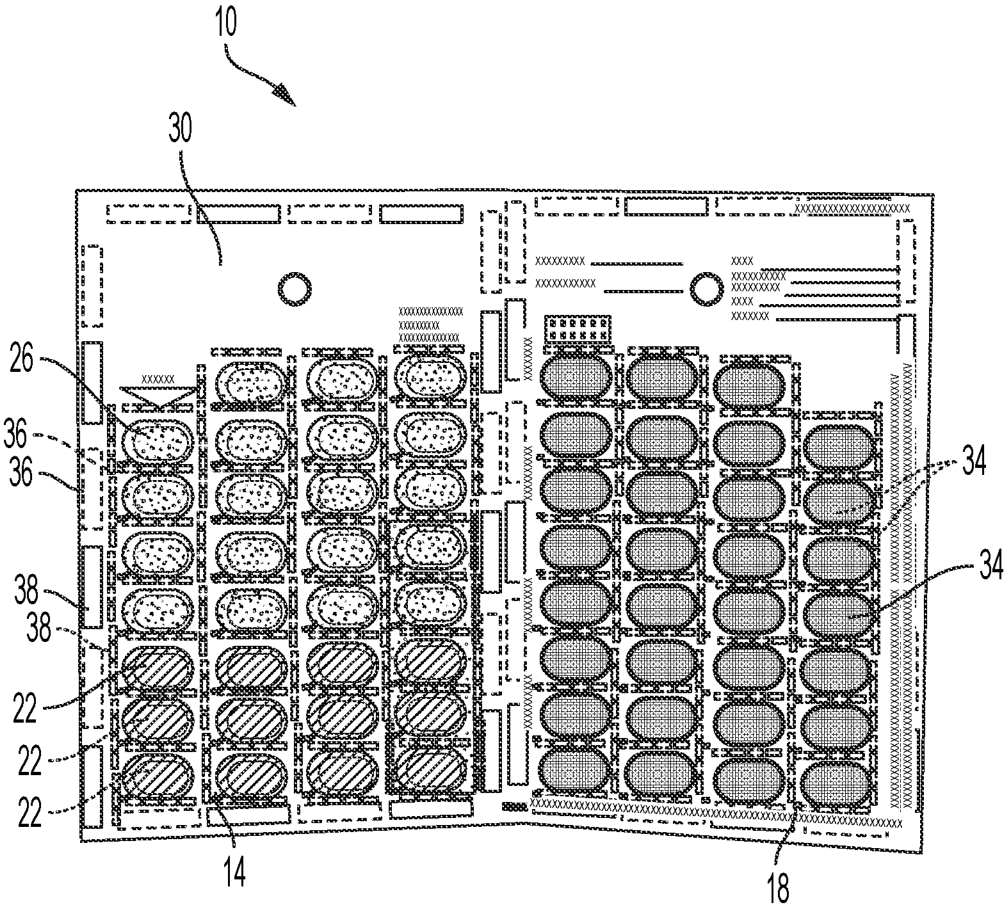
FIG. 1 illustrates a blister card in accordance with some examples.

FIG. 1 illustrates an example of a blister card 10 having a blister sheet 14 and a label sheet 18. The label sheet 18 is coupled to the blister sheet 14. The blister sheet 14 includes a plurality of blister compartments 22. In some examples, the blister sheet 14 has between twenty-eight to thirty-two blister compartments 22. The blister compartments 22 are each configured to receive a single unit of medication or may receive more than a single unit of medication. The blister card 10 is, for example, a standard 6"×9" card. In other examples, the blister card 10 may be other sizes. The blister card 10 may be used for filling different amounts of pills for different periods of time. For example, the blister card 10 may be used for one week of pills (e.g., 7 pills), for up to four weeks or a month of pills (e.g., 28-31 pills), or more. In some examples, the blister card 10 is a "pre-pack" having only one medication in some or all the blister compartments 22. In other examples, the blister card 10 may include more than one pill in the same blister compartment 22 or distributed among the different blister compartments 22.

The blister compartments 22 may be formed by a molded sheet of plastic 26. The blister compartments 22 are spaced apart from each other and are arranged in a plurality of rows and columns. The blister compartments 22 each define a recess in the blister sheet 14. The cross-section shapes of the blister compartments 22 viewed along a direction perpendicular to the blister sheet 14 may be squares, circles, rectangles, or ovals.

In the illustrated examples, the blister sheet 14 further includes a covering 30 over the sheet of plastic 26. The covering 30 may be made by a cardboard or paper material. The covering 30 may include instructions on filling the blister sheet 14.

In some constructions, the label sheet 18 is made from cardboard or paper. In some constructions, the label sheet 18 is a foil. In the example illustrated, the label sheet 18 is shown attached to the blister sheet 14. Specifically, the label sheet 18 can be attached to the covering 30 of the blister sheet 14. However, the label sheet 18 may be separately provided from the blister sheet 14. The label sheet 18, whether provided with the blister sheet 14 or separate from the blister sheet 14, may be sealed with the blister sheet 14 after filling. That is, the label sheet 18 may be laid over the blister sheet 14 to cover and enclose the blister compartments 22. In some examples, a bar code may printed on the label sheet 18 to provide identification information. The bar code may be scanned to retrieve information regarding the blister card 10. The bar code may be pre-printed before filling or may be printed after filling to uniquely identify the blister card 10. This bar code may be later used by a filling machine to identify that a correct blister card 10 is currently being filled.

The label sheet 18 includes a plurality of seal portions 34 which align with and correspond to each of the blister compartments 22. When the label sheet 18 is sealed to the blister sheet 14, the seal portions 34 close the recesses of the blister compartments 22 to form a plurality of interior spaces. The interior spaces are separated from each other and are separated from an exterior of the blister card 10. Each of the interior spaces is configured to store a single unit of medication or may store more than a single unit of medication. A user may tear the seal portions 34 to retrieve the packaged medication after the label sheet 18 is sealed with the blister sheet 14.

Figure 4:
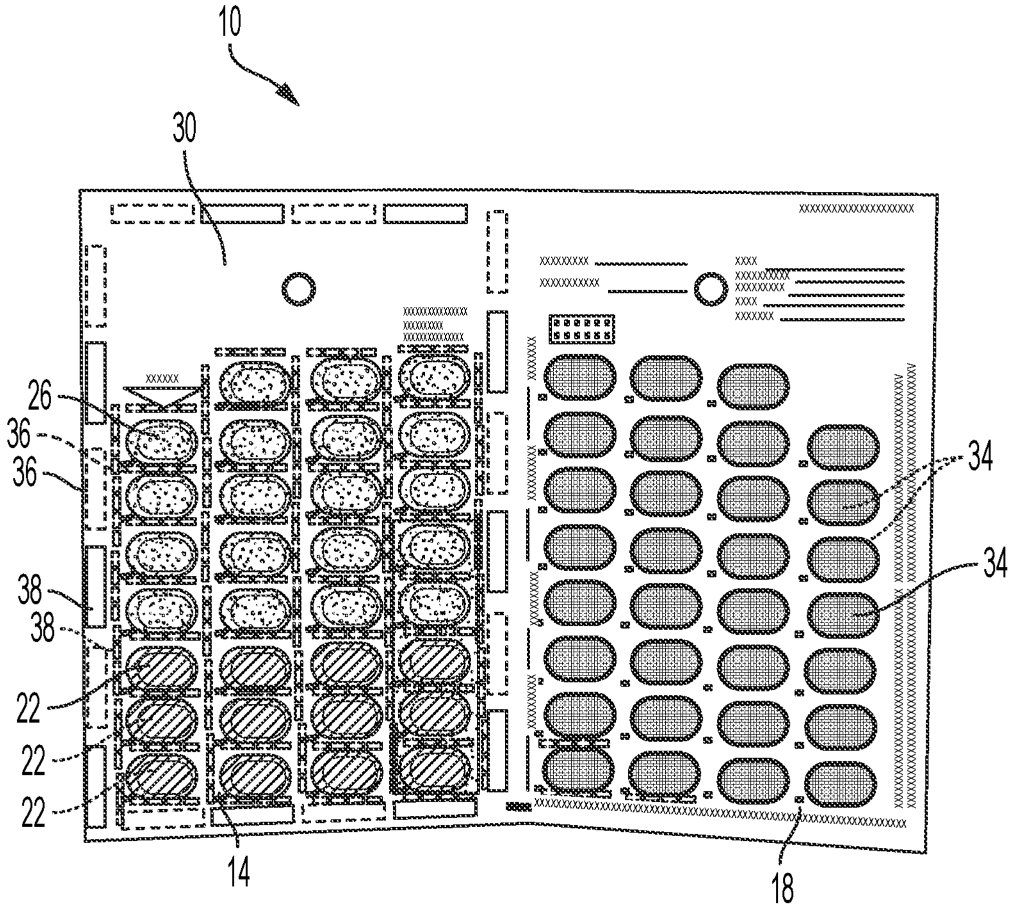
FIG. 4 illustrates a blister card in accordance with some examples.
Figure 5:
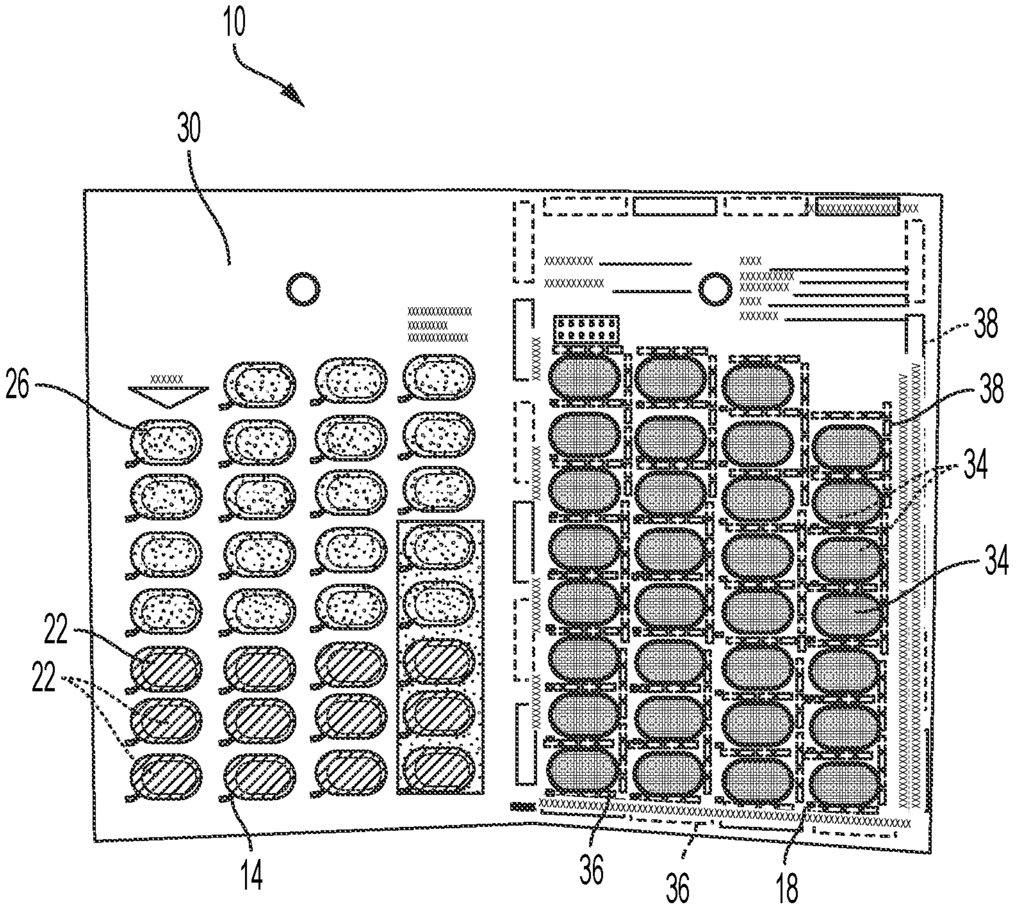
FIG. 5 illustrates a blister card in accordance with some examples.

The blister card 10 further includes a plurality of first seals 36 and a plurality of second seals 38 (for example, a plurality of seals) which couple, or seal, the label sheet 18 to the blister sheet 14. The first seals 36 (for example, a first subset of seals) may also be referred to as cold seals (for example, a first type of seal). The second seals 38 (for example, a second subset of seals) may also be referred to as hot seals (for example, a second type of seal). The cold seals 36 and the hot seals 38 are disposed between the label sheet 18 and the blister sheet 14. In some constructions, before the blister sheet 14 and the label sheet 18 are adhered, the cold seals 36 and the hot seals 38 are provided on both the label sheet 18 and the blister sheet 14 (see FIG. 1). In some constructions, before the blister sheet 14 and the label sheet 18 are adhered, the cold seals 36 and the hot seals 38 are provided only on the label sheet 18 (see FIG. 4). In some constructions, before the blister sheet 14 and the label sheet 18 are adhered, the cold seals 36 and the hot seals 38 are provided only on the blister sheet 14 (see FIG. 5). When the blister sheet 14 and the label sheet 18 are sealed, the cold seals 36 and the hot seals 38 abut both the blister sheet 14 and the label sheet 18.

The cold seals 36 may be arranged in rows along a perimeter of the blister card 10 between the blister sheet 14 and the label sheet 18. The cold seals 36 may additionally be arranged around each one of the blister compartments 22. Accordingly, some of the cold seals 36 may be arranged between the blister compartments 22 and some of the cold seals 36 may be arranged around the rows and columns of blister compartments 22.

The cold seals 36 temporarily adhere the label sheet 18 to the blister sheet 14 and do not require heat to be activated. The cold seals 36 can be an adhesive (e.g., tape, glue, etc.) or a coating. The cold seals 36 are activated by applying pressure (for example, first activation technique) to the label sheet 18 in the areas of the cold seals 36 after the label sheet 18 is overlaid on the blister sheet 14. In some constructions, the cold seals 36 are mechanical fasteners (e.g., punctures, paper clips, etc.) and may be activated differently than applying pressure (for example, by fastening). The cold seals 36 may also be bent portions of the blister sheet 14 and/or the label sheet 18 that interact with each other. The cold seals 36 temporarily inhibit the label sheet 18 from being removed from the blister sheet 14, which inhibits the medication in the interior spaces from being dislocated. In some examples, the cold seals 36 may also be referred to as non-tamperproof seals having lower adhesive strength (that is, non-zero adhesive strength) than hot seals 38. In these examples, when sealed using only the non-tamperproof seals, the blister card 10 may be opened to replace the medication before resealing using the non-tamperproof seals. The cold seals 36 may temporarily be used to transport the blister cards 10 between a filling station and a sealing station to prevent the medications from falling out of the blister compartments 22.

The hot seals 38 may be arranged in rows adjacent the rows of the cold seals 36. The hot seals 38 may be arranged in rows along a perimeter of the blister card 10 between the blister sheet 14 and the label sheet 18 and may additionally be arranged around each one of the blister compartments 22. Accordingly, some of the hot seals 38 may be arranged between the blister compartments 22 and some of the hot seals 38 may be arranged around the rows and columns of blister compartments 22. In some examples, the hot seals 38 may be arranged next to or adjacent the cold seals 36 (e.g., a line of hot seals 38 may be positioned next to a row of cold seals 36). In other examples, the hot seals 38 and the cold seals 36 may be located on different areas of the blister card 10. For example, the cold seals 36 may be arranged around an outer perimeter of the blister sheet 14 and/or the label sheet 18, while the hot seals 38 may be arranged around each individual blister compartment 22. Alternatively, the cold seals 36 may be positioned between rows of blister compartments 22, while the hot seals 38 may be positioned between columns of blister compartments 22. In other examples, the arrangement of the cold seals 36 and the hot seals 38 may be reversed. In still other examples, the hot seals 38 and the cold seals 36 may at least partially overlap. While the cold seals 36 may be considered temporary seals to initially attach the label sheet 18 to the blister sheet 14, the hot seals 38 may be considered permanent seals to secure the label sheet 18 to the blister sheet 14.

Before the hot seals 38 are activated, the cold seals 36 have a higher adhesive strength than the hot seals 38. In some constructions, before the hot seals 38 are activated, the hot seals 38 have no adhesive strength. After the hot seals 38 are activated, the hot seals 38 have a higher adhesive strength than the cold seals 36. The hot seals 38 provide stronger adhesive bonds between the label sheet 18 and the blister sheet 14 and are heat activated (for example, second activation technique). In some examples, the hot seals 38 may be activated using a different technique (for example, activation by applying water or other liquid). In other words, the hot seals 38 do not adhere the label sheet 18 to the blister sheet 14 unless heat is applied to the hot seals 38. The hot seals 38 can be an adhesive (e.g., tape, glue, etc.) or a coating. The hot seals 38 provide stronger adhesive bonds that strongly inhibit the label sheet 18 from being removed from the blister sheet 14 than the cold seals 36. The hot seals 38 accordingly inhibit medication in the interior spaces from being dislocated. In some examples, the hot seals 38 may also be referred to as tamperproof seals having higher adhesive strength than cold seals 36. In these examples, when sealed using the tamperproof seals, the blister card 10 cannot be opened to replace the medication without damaging the blister sheet 14, the label sheet 18, and/or other component of the blister card 10. The hot seals 38 may be used to seal the blister card 10 to provide a tamperproof steal for storage and for providing to the end customer.

In some examples, the hot seals 38 and the cold seals 36 may be the same seals as each other in the form of hot-cold seals 36. The hot-cold seals 36 may have low adhesive strength before being heated and may have a high adhesive strength after being activated. The low adhesive strength is relatively lower than the high adhesive strength. Before the hot-cold seals 36 are heated, the hot-cold seals 36 act as a cold seal and temporarily inhibit the label sheet 18 from being removed from the blister sheet 14. After the hot-cold seals 36 are heated, the hot-cold seals 36 act as a hot seal and provide stronger adhesion between the label sheet 18 and the blister sheet 14.

Figure 2:
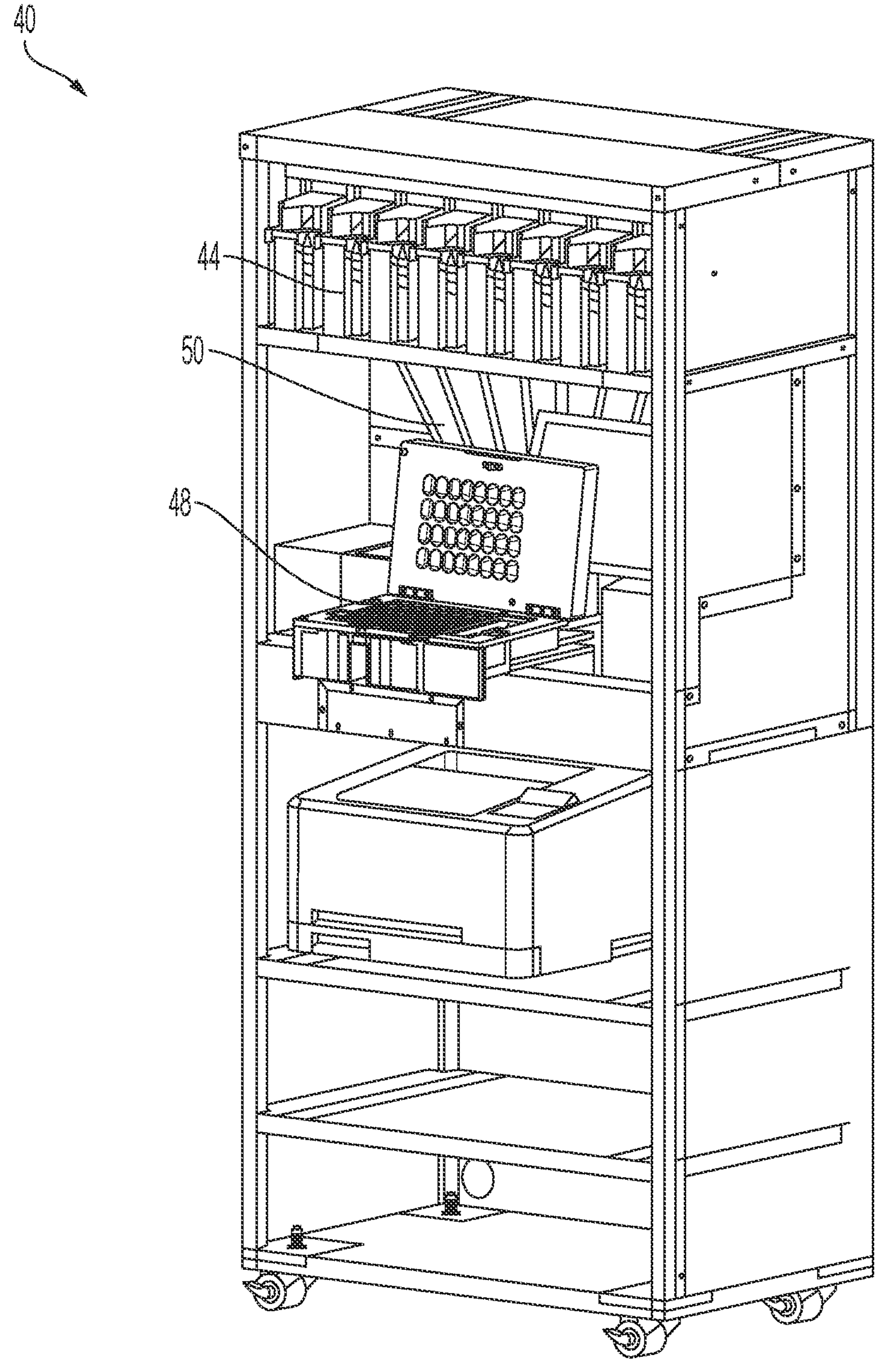
FIG. 2 is a perspective view of an automatic blister card packager in accordance with some examples.

The blister compartments 22 of the blister sheet 14 may be filled with at least one unit of medication by a user or by an automatic packager 40. FIG. 2 illustrates an automatic packager 40 including a feed cassette 44, a packaging unit 48, and a chute 50 configured to move medication from the cassette 44 to the packaging unit 48. The universal feed cassette 44 receives medications from bulk canisters and individually dispenses pills via the chute 5 to the blister compartments 22 when the blister card 10 is placed in the packaging unit 48.

Figure 3:
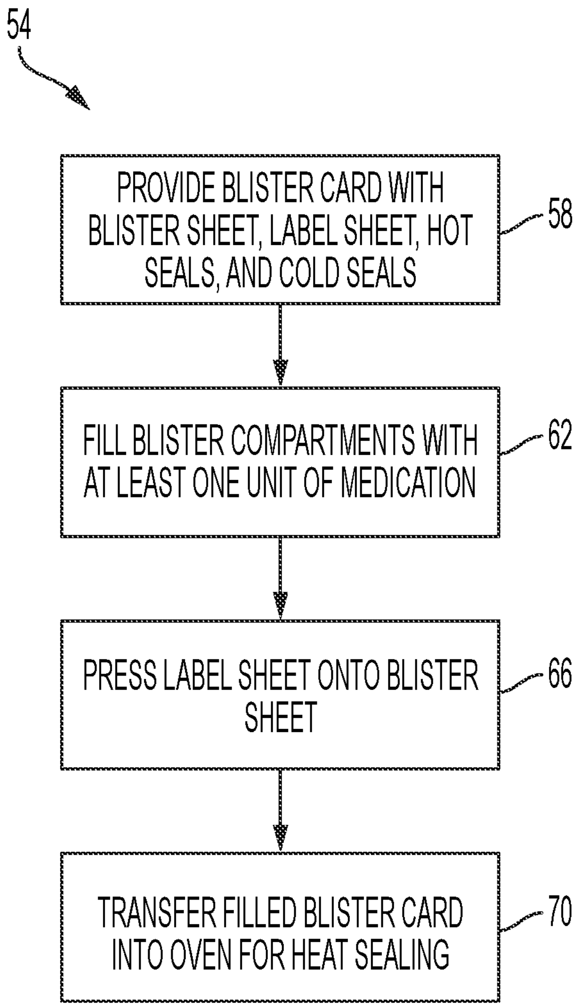
FIG. 3 is a flowchart of a method for packaging medication in a blister card in accordance with some examples.

FIG. 3 illustrates one example method 54 for packaging medication in a blister card 10. In the example illustrated, the method 54 includes providing the blister card 10 with the blister sheet 14, the label sheet 18, the hot seals 38, and the cold seals 36 (at block 58). In some constructions, the providing may include providing the blister sheet 14 with the hot seals 38 and cold seals 36 already applied to the blister sheet 14. In some constructions, the providing may include providing the label sheet 18 with the hot seals 38 and cold seals 36 already applied to the label sheet 18. In some examples, the method 54 may also include placing the blister sheet 14 in the packaging unit 48 of the automatic packager 40. In some examples, the method 54 may include placing the blister sheet 14 on a work surface (e.g., a counter, a table top, a blister card packaging assistant, etc.).

The method 54 also includes filling the blister compartments 22 with the at least one unit of medication (at block 62). The filling may include filling each blister with a corresponding at least one unit of medication. The filling may include leaving at least one of the blister compartments 22 empty. In some constructions, the filling may be carried out by the user manually placing the at least one unit of medication in each of the blister compartments 22. In some constructions, the filling may be carried out by the automatic packager 40. After the filling of the blister compartments 22, the method 54 includes pressing the label sheet 18 on to the blister sheet 14 (at block 66) so that the label sheet 18 covers the recesses and the cold seal adheres the label sheet 18 to the blister sheet 14. The pressing includes providing a temporary hold between the label sheet 18 and the blister sheet 14 via the cold seal so that the blister compartments 22 are closed.

The method 54 includes, transferring the filled blister card 10 into an oven for heat sealing (at block 70). The blister card 10 may be placed on, for example, a cork paddle to transfer the blister card 10 to the oven. In some constructions, the cork paddle may be a removable plate in the automatic packager 40. The temporary hold provided by the cold seal inhibits the at least one unit of medication from falling out of the blister card 10 during the transferring step. After transferring the blister card 10 into the oven, the blister card 10 is heated to activate the hot seal between the blister sheet 14 and the label sheet 18. In some constructions the blister card 10 is heated for more than two seconds and less than ten seconds. In some constructions, the blister card 10 is heated for more than three seconds and less than seven seconds. In some constructions, the blister card 10 is heated for approximately five seconds. After the hot seal is activated, the blister card 10 is removed from the oven.

The activation of the hot seal provides a strong hold between the blister sheet 14 and the label sheet 18 so that the at least one unit of medication is contained in the interior spaces. Accordingly, after the blister sheet 14 is adhered to the label sheet 18 by the hot seal, the user can only access the at least one unit of medication by breaking the seal portions 34 of the label sheet 18.

The cold seals 36 on the blister cards 10 described above, thereby, provide a quick way to enclose the blister compartments 22 after the blister compartments 22 are filled. As such, if the blister cards 10 are accidentally dropped or shaken while being transferred to an oven (or other heating mechanism), medications within the blister compartments 22 are less likely to fall out. The hot seals 38 then provide a more permanent seal to inhibit tampering with the blister cards 10 until medications are deliberately removed from the blister cards 10 through the seal portions 34.

Thus, the disclosure provides, among other things, a blister card for packaging pharmaceuticals. Various features and advantages of the disclosure are set forth in the following claims.

The invention claimed is:

1. A blister card for packaging pharmaceuticals comprising:

a blister sheet including a plurality of blister compartments, each blister compartment defining a recess configured to receive medications;

a label sheet configured to be placed over the blister sheet to cover the plurality of blister compartments and including a plurality of seal portions that align with and correspond to each of the plurality of blister compartments; and a plurality of seals including a first type of seal and a second type of seal configured to adhere the label sheet to the blister sheet, the second type of seal being different than the first type of seal, wherein the plurality of seals includes a first subset of seals of the first type of seal and a second subset of seals of the second type of seal.

2. The blister card of claim 1, wherein the first type of seal is a cold seal and the second type of seal is a hot seal.

3. The blister card of claim 1, wherein the plurality of seals is provided on the blister sheet and the label sheet prior to adhering the label sheet to the blister sheet.

4. The blister card of claim 1, wherein when the blister sheet and the label sheet are adhered, the plurality of seals abuts both the blister sheet and the label sheet.

5. The blister card of claim 1, wherein the first subset of seals is arranged along a perimeter of the blister card between the blister sheet and the label sheet.

6. The blister card of claim 5, wherein the second subset of seals is provided adjacent the first subset of seals along the perimeter of the blister card.

7. The blister card of claim 1, wherein the first subset of seals is arranged between the plurality of blister compartments.

8. The blister card of claim 7, wherein the second subset of seals is provided adjacent the first subset of seals between the plurality of blister compartments.

9. The blister card of claim 1, wherein the first type of seal is configured to temporarily adhere the label sheet to the blister sheet and does not require heat to be activated.

10. The blister card of claim 9, wherein the first type of seal is activated by applying pressure to the first type of seal.

11. The blister card of claim 9, wherein the second type of seal is heat activated.

12. The blister card of claim 1, wherein the first type of seal has a higher adhesive strength prior to activation compared to the second type of seal, and wherein the second type of seal has a higher adhesive strength after activation compared to the first type of seal.

13. The blister card of claim 12, wherein the second type of seal has no adhesive strength prior to activation.

14. The blister card of claim 1, wherein the first type of seal is a non-tamperproof seal and the second type of seal is a tamperproof seal.

15. A blister card for packaging pharmaceuticals comprising:

a blister sheet including a plurality of blister compartments, each blister compartment defining a recess configured to receive medications;

a label sheet configured to be placed over the blister sheet; and a plurality of cold seals and a plurality of hot seals provided between the blister sheet and the label sheet and configured to adhere the label sheet to the blister sheet, wherein the plurality of cold seals has higher adhesive strength compared to the plurality of hot seals prior to heat activation of the plurality of hot seals.

16. The blister card of claim 15, wherein the plurality of cold seals is arranged along a perimeter of the blister card between the blister sheet and the label sheet, and wherein the plurality of hot seals is provided adjacent each of the plurality of cold seals along the perimeter of the blister card.

17. The blister card of claim 15, wherein the plurality of cold seals is arranged between the plurality of blister compartments, and wherein the plurality of hot seals is provided adjacent each of the plurality of cold seals between the plurality of blister compartments.

18. The blister card of claim 15, wherein the plurality of cold seals are non-tamperproof seals and the plurality of hot seals are tamperproof seals.

19. A method of filling a blister card, the method comprising:

providing a blister sheet including a plurality of blister compartments, each blister compartment defining a recess configured to receive medications;

filling at least one of the plurality of blister compartments with one or more medications;

placing a label sheet over the blister sheet to cover the plurality of blister compartments, the label sheet including a plurality of seals that align with and correspond to each of the plurality of blister compartments, the plurality of seals including a first subset of seals of a first type of seal and a second subset of seals of a second type of seal, the second type of seal being different from the first type of seal;

activating the first type of seal between the blister sheet and the label sheet to temporarily connect the label sheet to blister sheet; and activating the second type of seal between the blister sheet and the label sheet to permanently secure the label sheet to the blister sheet.

20. The method of claim 19, wherein activating the first type of seal includes activating a cold seal.

21. The method of claim 19, wherein activating the second type of seal includes activating a hot seal.

22. The method of claim 19, wherein the first type of seal is a non-tamperproof seal and the second type of seal is a tamperproof seal.

23. A blister card for packaging pharmaceuticals comprising:

a blister sheet including a plurality of blister compartments, each blister compartment defining a recess configured to receive medications;

a label sheet configured to be placed over the blister sheet to cover the plurality of blister compartments and including a plurality of seal portions that align with and correspond to each of the plurality of blister compartments; and a plurality of seals configured to adhere the label sheet to the blister sheet, the plurality of seals having a first adhesive strength when activated using a first activation technique and having a second adhesive strength when activated using a second activation technique, wherein the first adhesive strength is a non-zero adhesive strength and the second adhesive strength is higher than the first adhesive strength, wherein the plurality of seals is provided on the blister sheet and the label sheet prior to adhering the label sheet to the blister sheet.

24. The blister card of claim 23, wherein the plurality of seals form a non-tamperproof seal when activated using the first activation technique and form a tamperproof seal when activated using the second activation technique.

25. The blister card of claim 23, wherein when the blister sheet and the label sheet are adhered, the plurality of seals abuts both the blister sheet and the label sheet.

26. The blister card of claim 23, wherein the plurality of seals includes a first subset of seals and a second subset of seals, wherein the first subset of seals is arranged along a perimeter of the blister card between the blister sheet and the label sheet, and wherein the second subset of seals is arranged between the plurality of blister compartments.

* * * * *